US012458143B2

(12) United States Patent
Fei et al.

(10) Patent No.: US 12,458,143 B2
(45) Date of Patent: Nov. 4, 2025

(54) ELECTRIC SLIDE RAIL

(71) Applicants: CHONGQING HAIER REFRIGERATION ELECTRIC APPLIANCE CO., LTD., Chongqing (CN); QINGDAO HAIER REFRIGERATOR CO., LTD., Qingdao (CN); HAIER SMART HOME CO., LTD., Qingdao (CN)

(72) Inventors: Bin Fei, Qingdao (CN); Lulu Huang, Qingdao (CN); Bintang Zhao, Qingdao (CN)

(73) Assignees: CHONGQING HAIER REFRIGERATION ELECTRIC APPLIANCE CO., LTD., Qingdao (CN); QINGDAO HAIER REFRIGERATOR CO., LTD., Qingdao (CN); HAIER SMART HOME CO., LTD., Qingdao (CN)

( * ) Notice: Subject to any disclaimer, the term of this patent is extended or adjusted under 35 U.S.C. 154(b) by 65 days.

(21) Appl. No.: 18/293,209

(22) PCT Filed: Jun. 13, 2022

(86) PCT No.: PCT/CN2022/098432
§ 371 (c)(1),
(2) Date: Jan. 29, 2024

(87) PCT Pub. No.: WO2023/005460
PCT Pub. Date: Feb. 2, 2023

(65) Prior Publication Data
US 2024/0277143 A1 Aug. 22, 2024

(30) Foreign Application Priority Data
Jul. 30, 2021 (CN) ........................ 202110874916.X

(51) Int. Cl.
*F16C 29/02* (2006.01)
*A47B 88/447* (2017.01)
(Continued)

(52) U.S. Cl.
CPC .......... *A47B 88/457* (2017.01); *A47B 88/447* (2017.01); *A47B 88/45* (2017.01);
(Continued)

(58) Field of Classification Search
CPC ..... A47B 88/44; A47B 88/443; A47B 88/447; A47B 88/45; A47B 88/457; A47B 88/49;
(Continued)

(56) References Cited

U.S. PATENT DOCUMENTS

2010/0236279 A1* 9/2010 Eom .................... A47B 88/457 62/449
2019/0242640 A1 8/2019 Minoru et al.
(Continued)

FOREIGN PATENT DOCUMENTS

CN 107874499 A 4/2018
CN 110664140 A 1/2020
(Continued)

OTHER PUBLICATIONS

WO2018133431_A1_Description.*

*Primary Examiner* — Phillip A Johnson
(74) *Attorney, Agent, or Firm* — MUNCY, GEISSLER, OLDS & LOWE, P.C.

(57) ABSTRACT

An electric slide rail (100) comprising: a track system (110); a power assembly (120); and a transmission system; wherein the track system (110) comprises an upper rail (111), a middle rail (112), and a lower rail (113) arranged from top to bottom, the power assembly (120) is fixed to the lower rail (113), the transmission system is fixed to the middle rail (112), and the electric slide rail (100) is configured such that
(Continued)

the power assembly (120) provides power to move the track system (110) via the transmission system.

4 Claims, 1 Drawing Sheet

(51) Int. Cl.

| | |
|---|---|
| ***A47B 88/45*** | (2017.01) |
| ***A47B 88/457*** | (2017.01) |
| ***A47B 88/49*** | (2017.01) |

(52) U.S. Cl.
CPC ...... *F16C 29/02* (2013.01); *A47B 2210/0075* (2013.01); *A47B 2210/0078* (2013.01); *A47B 2210/175* (2013.01); *F16C 2314/70* (2013.01)

(58) Field of Classification Search
CPC .......... A47B 88/493; A47B 2210/0072; A47B 2210/0075; F16C 29/02; F16C 29/04; F16C 2314/72
See application file for complete search history.

(56) References Cited

U.S. PATENT DOCUMENTS

| | | | | |
|---|---|---|---|---|
| 2020/0345139 | A1* | 11/2020 | Kim | A47B 88/437 |
| 2023/0180931 | A1* | 6/2023 | Xi | A47B 88/457 312/408 |

FOREIGN PATENT DOCUMENTS

| | | | | |
|---|---|---|---|---|
| CN | 111623590 A | | 9/2020 | |
| CN | 112127732 A | | 12/2020 | |
| CN | 112127740 A | | 12/2020 | |
| JP | 2010534090 A | | 11/2010 | |
| KR | 20190041394 A | | 4/2019 | |
| WO | WO-2010017505 A1 | * | 2/2010 | A47B 88/40 |
| WO | WO-2018133431 A1 | * | 7/2018 | A47B 88/40 |
| WO | WO2023005460 A1 | | 2/2023 | |

* cited by examiner

ELECTRIC SLIDE RAIL

TECHNICAL FIELD

The present invention relates to the field of slide rail technology, and in particularly to an electric slide rail.

BACKGROUND

Slide rails can bear substantial loads while requiring minimal effort to facilitate linear, reciprocal movement. This characteristic has led to the increasing incorporation of slide rail components in refrigerator products, ranging from internal storage parts (drawers, shelves, etc.) to refrigerator doors.

Traditional synchronous slide rails generally operate as follows in the transition from closed to open state: the upper rail is forced to move in the forward direction: the upper rail drives the belt fixed to the upper rail to move at the same time in the same direction; the belt causes the front and rear synchronous wheels to rotate counterclockwise; simultaneously, as the lower rail belt is fixed and the lower rail is a fixed installation rail, the middle rail also moves in the same direction as the upper rail, but at half the speed: the rear synchronous wheel, provided with a synchronous shaft, drives the slide rail on the other side to move synchronously. The process from open to closed state follows the same principle but in the reverse direction. Existing synchronous slide rails lack a power and transmission system, requiring continuous manual force to slide until fully open or closed.

Due to the need for continuous manual force to facilitate movement until fully open or closed, users face inconvenience in certain scenarios. For example, when a user's hands are full and they need to open the refrigerator, or when elderly users bend to retrieve or store items in the refrigerator, it becomes difficult to continuously pull or push the slide rails to fully open or close them, leading to a poor user experience.

SUMMARY

One objective of the present invention is to enable the slide rail to open and close automatically, enhancing the user experience.

A further objective is to reduce the jerky motion during the slide rail's movement, thereby improving its smoothness.

Particularly, the present invention provides an electric slide rail. The electric slide rail comprising: a track system: a power assembly; and a transmission system: wherein the track system comprises an upper rail, a middle rail, and a lower rail arranged from top to bottom, the power assembly is fixed to the lower rail, the transmission system is fixed to the middle rail, and the electric slide rail is configured such that the power assembly provides power to move the track system via the transmission system.

Optionally, the power assembly comprises a motor and a power wheel, and the power assembly is configured such that when powered, the motor starts operating, driving the power wheel to rotate.

Optionally, the transmission system is configured as a transmission rack, and the transmission rack meshes with the power wheel.

Optionally, the rotation of the power wheel simultaneously drives the transmission rack, causing the middle rail to move along.

Optionally, the electric slide rail further comprising a front synchronous wheel, a rear synchronous wheel, and a synchronous belt, wherein both the front and rear synchronous wheels are fixed to the middle rail, and the synchronous belt is attached to the upper and lower rails through upper and lower fixed components, respectively.

Optionally, as the middle rail moves, the front and rear synchronous wheels rotate under the action of the synchronous belt, causing the upper rail to displace as well.

Optionally, between the two electric slide rails, a synchronous shaft is installed, with each end of the synchronous shaft fixed to the center of the rear synchronous wheel of each electric slide rail.

Optionally, the rear synchronous wheel of one electric slide rail drives the synchronous shaft to rotate, which in turn drives the other electric slide rail to perform synchronized displacement movement.

Optionally, the power assembly further comprises an auxiliary device, configured to assist the motor's operation, and the auxiliary device comprises a clutch and a reducer.

Optionally, the displacement and linear velocity of the upper rail are twice the displacement and linear velocity of the middle rail.

The electric slide rail of the present invention comprises a track system, a power assembly, and a transmission system. The track system includes an upper rail, a middle rail, and a lower rail arranged from top to bottom. The power assembly is fixed to the lower rail, and the transmission system is attached to the middle rail. The electric slide rail is configured such that the power assembly provides the force to drive the transmission system, which in turn moves the track system. With a novel power and transmission system, the slide rail moves without the need for continuous manual input, addressing the use requirements of different scenarios. This high level of automation effectively enhances the user experience.

Furthermore, the electric slide rail of the present invention also includes a front synchronous wheel, a rear synchronous wheel, and a synchronous belt. Both the front and rear synchronous wheels are fixed to the middle rail, while the synchronous belt is attached to the upper and lower rails through upper and lower fixed components, respectively. As the middle rail moves, the synchronous belt causes the front and rear synchronous wheels to rotate accordingly, driving the upper rail to displace as well. During the movement of the slide rail, both the upper and lower rails displace simultaneously and reach their endpoints without any jarring or jerky sensations.

Moreover, in the present embodiment, the transmission rack is positioned above the middle rail. Since the displacement of the upper rail is twice that of the middle rail, this positioning allows for the maximum displacement of the entire track system with the minimal length of the transmission rack.

The detailed description of specific embodiments of the present invention, in conjunction with the drawings, will further clarify to those skilled in the art the aforementioned and other objectives, advantages, and features of the present invention.

BRIEF DESCRIPTION OF THE DRAWINGS

The following text will describe some specific embodiments of the present invention in a detailed yet non-limiting manner with reference to the accompanying drawings. In the drawings, identical reference numerals denote the same or similar parts or components. Those skilled in the art should understand that these drawings are not necessarily drawn to scale. In the drawings.

DETAILED DESCRIPTION

Figure 1:
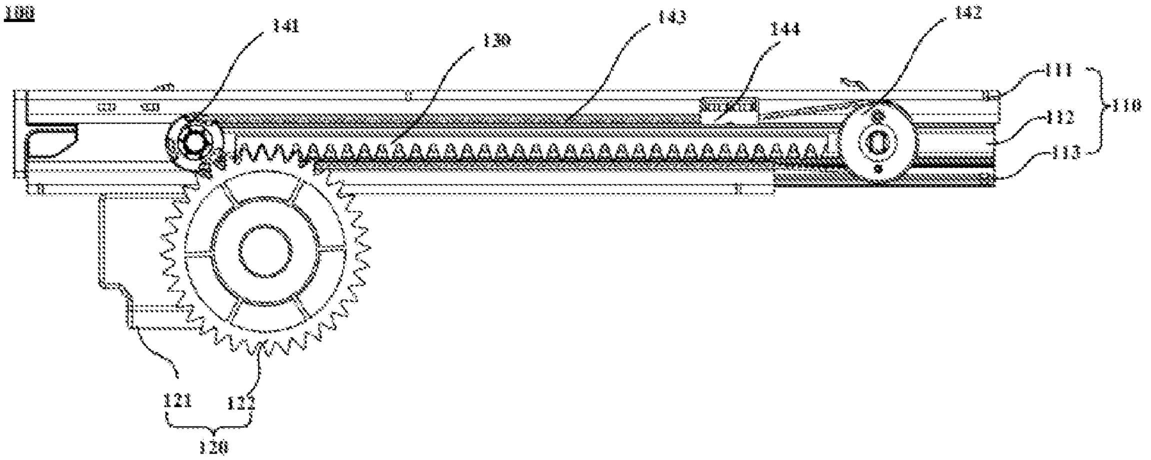
FIG. 1 is a front view of an electric slide rail according to an embodiment of the present invention.
Figure 2:
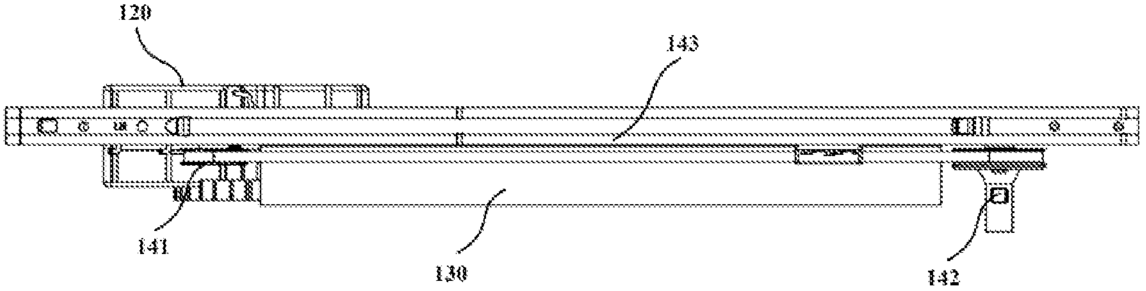
FIG. 2 is a top view of an electric slide rail according to an embodiment of the present invention.

The present embodiment provides an electric slide rail that adopts a novel power and transmission system, the electric slide rail moves without the need for continuous manual output to address the use requirements of different scenarios. FIGS. 1 and 2 show a front and top view, respectively, of an electric slide rail 100 according to an embodiment of the present invention. As shown in FIGS. 1 and 2, the electric slide rail 100 generally includes a track system 110, a power assembly 120, and a transmission system.

The track system 110 comprises an upper rail 111, a middle rail 112, and a lower rail 113 arranged from top to bottom, the power assembly 120 is fixed to the lower rail 113, and the transmission system is fixed to the middle rail 112. The electric slide rail 100 is configured such that the power assembly 120 provides power to move the track system 110 via the transmission system.

In a specific embodiment, the power assembly 120 can include a motor 121 and a power wheel 122, configured such that when powered, the motor 121 starts operating, driving the power wheel 122 to rotate. In a preferred embodiment, the power assembly 120 may also include an auxiliary device configured to assist the operation of the motor 121, comprising a clutch and a reducer.

In the present embodiment, the electric slide rail 100 includes a track system 110, a power assembly 120, and a transmission system, wherein the track system 110 comprises an upper rail 111, a middle rail 112, and a lower rail 113 arranged from top to bottom, the power assembly 120 is fixed to the lower rail 113, and the transmission system is fixed to the middle rail 112.

The electric slide rail 100 is configured such that the power assembly 120 provides power to move the track system 110 via the transmission system. This new power and transmission system enables the slide rail to move without continuous manual output, meeting the usage requirements of different scenarios.

In a preferred embodiment, the transmission system is a transmission rack 130, and the transmission rack 130 meshes with the power wheel 122. The transmission rack 130 is provided above the middle rail 112. Since the displacement and linear velocity of the upper rail 111 are twice that of the middle rail 112, the providing of the transmission rack 130 allows for the maximum displacement of the entire track system 110 with the minimal length of the transmission rack 130. Minimizing the length of the transmission rack 130 effectively saves costs and space.

It should be noted that as the power wheel 122 rotates, it simultaneously drives the transmission rack 130, causing the middle rail 112 to move along. In a preferred embodiment, the electric slide rail 100 may also include a front synchronous wheel 141, a rear synchronous wheel 142, and a synchronous belt 143, where both the front synchronous wheel 141 and the rear synchronous wheel 142 are fixed to the middle rail 112, and the synchronous belt 143 is fixed to the upper rail 111 and the lower rail 113 through an upper fixed component 144 and a lower fixed component (not shown in the diagram) respectively.

As the middle rail 112 moves, the front synchronous wheel 141 and the rear synchronous wheel 142 rotate under the action of the synchronous belt 143, causing the upper rail 111 to displace as well. In a specific embodiment, the electric slide rail 100 of the present embodiment can be applied to drawers and other items, with two electric slide rails 100 set on both sides at the bottom of the drawer.

In a preferred embodiment, a synchronous shaft is provided between two electric slide rails 100, with each end of the synchronous shaft fixed to the center of the rear synchronous wheel 142 of each electric slide rail 100. The rear synchronous wheel 142 of one electric slide rail 100 drives the synchronous shaft to rotate, which in turn drives the other electric slide rail 100 to perform synchronized displacement movement.

This means that the electric slide rail 100 of the present embodiment provides a synchronization system, thus only requiring the installation of the power assembly 120 and its transmission system on one side of the electric slide rail 100 to achieve automatic opening and closing of the slide rail. Moreover, under the action of the synchronization system, during the movement of the electric slide rail 100, both the upper rail 111 and the lower rail 113 displace simultaneously and reach their endpoints without any jarring or jerky sensations.

Installing the power assembly 120 with the transmission system on just one side of the electric slide rail 100 can effectively reduce production costs, improve assembly efficiency, and minimize the overall space occupied by the electric slide rail 100. When applied to sealed drawers in refrigerators, this can avoid occupying storage container space.

The electric slide rail 100 of the present embodiment includes: a track system 110, a power assembly 120, and a transmission system, wherein the track system 110 comprises an upper rail 111, a middle rail 112, and a lower rail 113 arranged from top to bottom, the power assembly 120 is fixed to the lower rail 113, and the transmission system is fixed to the middle rail 112. The electric slide rail 100 is configured such that the power assembly 120 provides power, enabling the transmission system to move the track system 110. This new power and transmission system eliminates the need for continuous manual output, addressing the use requirements of different scenarios.

Furthermore, the electric slide rail 100 of the present embodiment also includes: a front synchronous wheel 141, a rear synchronous wheel 142, and a synchronous belt 143, where the front synchronous wheel 141 and the rear synchronous wheel 142 are fixed to the middle rail 112, and the synchronous belt 143 is fixed to the upper rail 111 and the lower rail 113 through an upper fixed component 144 and a lower fixed component respectively. As the middle rail 112 moves, the front synchronous wheel 141 and the rear synchronous wheel 142 rotate under the action of the synchronous belt 143, causing the upper rail 111 to displace as well. During the movement of the slide rail, both the upper rail 111 and the lower rail 113 displace simultaneously and reach their endpoints without any jarring or jerky sensations.

Additionally, in the present embodiment, the transmission rack 130 of the electric slide rail 100 is provided above the middle rail 112. Since the displacement and linear velocity of the upper rail 111 are twice that of the middle rail 112, this providing allows for the maximum displacement of the entire track system 110 with the minimal length of the transmission rack 130.

It should be noted that in other embodiments, there may be substitutions for some structures, devices, and method steps, or complete alternatives for the technical solution. For example, in the present embodiment, the power assembly 120 is fixed to the lower rail 113 for component integration and ease of subsequent installation. In other embodiments, the power assembly 120 can also be mounted above a fixed surface near the lower rail 113. A transmission gear can be added between the power wheel 122 and the transmission rack 130 to reduce the diameter of the power wheel 122 and increase the power output. The number of the transmission gear can be one or several.

Moreover, in the present embodiment, the transmission rack 130 is fixed above the middle rail 112. In other embodiments, the transmission rack 130 can also be fixed above the upper rail 111. The position of the transmission rack 130 and the synchronous belt 143 are on the same side in the present embodiment. In other embodiments, the position of the transmission rack 130 can be set on the opposite side of the synchronous belt 143.

It is important to emphasize that the specific process of traditional synchronous slide rails from closed to open state generally follows this sequence: the upper rail is forced to move in the forward direction: the upper rail drives the belt fixed to the upper rail to move at the same time in the same direction: the belt causes the front and rear synchronous wheels to rotate counterclockwise: simultaneously, as the lower rail belt is fixed and the lower rail is a fixed installation rail, the middle rail also moves in the same direction as the upper rail, but at half the speed: the rear synchronous wheel, provided with a synchronous shaft, drives the slide rail on the other side to move synchronously. The process from open to closed state follows the same principle but in the reverse direction. Existing synchronous slide rails lack a power and transmission system, requiring continuous manual force to slide open or close completely.

The electric slide rail 100 of the present embodiment, through the design of a new power and transmission system, provides continuous power output for the movement of the slide rail. This solves the problem of conventional slide rails requiring continuous manual pulling/pushing force for movement. It can be paired with different control modes for opening and closing, such as buttons, voice commands, touch, tapping, or applying a brief pushing/pulling force, to meet the needs of various scenarios.

In summary; the entire working process of the electric slide rail 100 in the present embodiment can be described as follows: the motor 121 is powered on and begins to operate, driving the power wheel 122 to rotate. As the power wheel 122 rotates, it drives the transmission rack 130, causing the middle rail 112 to move along. Simultaneously, as the middle rail 112 moves, the front synchronous wheel 141 and the rear synchronous wheel 142 rotate under the action of the synchronous belt 143, causing the upper rail 111 to displace as well. The rear synchronous wheel 142 of one electric slide rail 100 drives the synchronous shaft to rotate, which in turn drives the other electric slide rail 100 to perform synchronized displacement movement.

As mentioned earlier, the electric slide rail 100 of the present embodiment can be applied to drawers and other items, with two electric slide rails 100 set on both sides at the bottom of the drawer. Further, the drawer can be applied to refrigerators. A refrigerator generally includes: a cabinet, a door, and a sealed drawer.

The cabinet defines storage space and a cooling chamber. The storage space is divided into multiple storage areas, and the number and structure of these spaces can be configured according to needs. Storage spaces can be designated as refrigeration, freezing, variable temperature, or freshness preservation areas. Each storage space can be divided into multiple areas by partitions and use shelves or drawers for storing items. At least one storage space in the refrigerator is provided with a sealed drawer, with electric slide rails 100 fixed to both sides of the drawer's bottom using reinforced iron. Only one side of the electric slide rail 100 needs to install the power assembly 120 and transmission system to achieve synchronized movement, while the other side does not.

The door can be set on the front surface of the cabinet to operably open and close the storage space. Each storage space corresponds to one or more doors. The number of storage spaces and doors, and the function of each storage space, can be chosen based on specific situations. The door can be pivotally mounted at the front surface of the cabinet or can be drawer-style. Drawer-style storage spaces can be provided with the electric slide rail 100 of the present embodiment, ensuring a gentle opening and closing process and reducing noise.

An evaporator is provided in the cooling chamber and configured to provide cooling to the storage spaces. The evaporator supplies different amounts of cooling to various types of storage spaces, resulting in different temperatures within them. For example, the temperature in the refrigeration space is generally between 2° C. and 10° C., preferably 4° C. to 7° ° C. The temperature range in the freezing space is generally −22° C. to −14° C. Different types of items have different optimal storage temperatures, and hence, suitable storage spaces vary. For instance, vegetables are best stored in refrigeration or freshness preservation spaces, while meats are suitable for freezing spaces.

The sealed drawer in the present embodiment can include: a drawer box and a drawer body: The drawer box, providing a front opening, is fixed to the inner liner of the cabinet. The drawer body is slidably mounted inside the drawer box, allowing it to be operably pulled out and pushed in from the front opening of the drawer box. It should be noted that the inner liner and the drawer box can be integrally formed or separately molded and then installed. The cabinet can also include: a shell and an insulation layer. The shell is provided outside the inner liner, and the insulation layer, placed between the shell and the inner liner, serves to isolate the heat from outside the refrigerator.

A specific embodiment is introduced as follows: In the case where the sealed drawer of the refrigerator is provided with the electric slide rail 100 of the present embodiment, a user's command to open the sealed drawer can be received. According to this command, the motor 121 is powered to start operating, driving the power wheel 122 to rotate. As the power wheel 122 rotates, it drives the transmission rack 130, causing the middle rail 112 to move along. Simultaneously, as the middle rail 112 moves, the front synchronous wheel 141 and the rear synchronous wheel 142 rotate under the action of the synchronous belt 143, causing the upper rail 111 to displace as well. The rear synchronous wheel 142 of one electric slide rail 100 drives the synchronous shaft to rotate, which in turn drives the other electric slide rail 100 to perform synchronized displacement movement. In other words, applying the electric slide rail 100 of the present embodiment can enhance the overall intelligence level of home appliances like refrigerators, contributing to the upgrade of smart home appliances and greatly enhancing the user experience.

The electric slide rail 100 of the present embodiment includes: a track system 110, a power assembly 120, and a transmission system, where the track system 110 comprises an upper rail 111, a middle rail 112, and a lower rail 113 arranged from top to bottom, the power assembly 120 is fixed to the lower rail 113, and the transmission system is fixed to the middle rail 112. The electric slide rail 100 is configured such that the power assembly 120 provides power, enabling the transmission system to move the track system 110. This new power and transmission system eliminates the need for continuous manual output, addressing the use requirements of different scenarios.

Furthermore, the electric slide rail 100 of the present embodiment also includes: a front synchronous wheel 141, a rear synchronous wheel 142, and a synchronous belt 143, where the front synchronous wheel 141 and the rear synchronous wheel 142 are fixed to the middle rail 112, and the synchronous belt 143 is attached to the upper rail 111 and the lower rail 113 through an upper fixed component 144 and a lower fixed component respectively. As the middle rail 112 moves, the front synchronous wheel 141 and the rear synchronous wheel 142 rotate under the action of the synchronous belt 143, causing the upper rail 111 to displace as well. During the movement of the slide rail, both the upper rail 111 and the lower rail 113 displace simultaneously and reach their endpoints without any jarring or jerky sensations.

Additionally, in the present embodiment, the transmission rack 130 is positioned above the middle rail 112. Since the displacement and linear velocity of the upper rail 111 are twice that of the middle rail 112, this positioning allows for the maximum displacement of the entire track system 110 with the minimal length of the transmission rack 130.

In the description of the present embodiment, it should be understood that terms like “longitudinal,” “lateral,” “length,” “width,” “thickness,” “upper,” “lower,” “front,” “rear,” “left,” “right,” “vertical,” “horizontal,” and other directional or positional references are based on the orientations or positional relationships shown in the drawings. They are used solely for the convenience of describing the invention and simplifying the description, and do not imply that the devices or components referred to must have a specific orientation, be constructed and operated in a specific orientation, and thus should not be construed as limiting the invention.

Unless explicitly defined and limited, terms such as “mounted,” “connected.” “coupled,” “fixed,” and “interconnected” should be broadly understood. For example, they can represent fixed connections, removable connections, or integrally formed connections: they can be mechanical connections or electrical connections: they can be direct connections or indirect connections through intermediaries; and they can represent internal communications within a component or the interaction between components, unless explicitly limited otherwise. Persons skilled in the art should understand the specific meanings of these terms in the context of the invention according to the specific circumstances.

In the description of the present embodiment, reference terms like “an embodiment,” “some embodiments,” “an illustrative embodiment,” “an example,” “a specific example,” or “some examples” mean that a particular feature, structure, material, or characteristic described in connection with the embodiment or example is included in at least one embodiment or example of the invention. In this document, such indicative expressions of the aforementioned terms do not necessarily refer to the same embodiment or example. Moreover, the described specific features, structures, materials, or characteristics may be combined in any suitable manner in one or more embodiments or examples.

Thus far, persons skilled in the art should recognize that although numerous illustrative embodiments of the invention have been shown and described in detail, many other variations or modifications consistent with the principles of the invention can be directly determined or derived from the content disclosed by the invention without departing from the spirit and scope of the invention. Therefore, the scope of the invention should be understood and recognized as covering all these other variations or modifications.

What is claimed is:

1. An electric slide rail comprising:

a track system;

a power assembly; and a transmission system;

wherein the track system comprises an upper rail, a middle rail, and a lower rail arranged from top to bottom, the power assembly is fixed to the lower rail, the transmission system is fixed to the middle rail, and the electric slide rail is configured such that the power assembly provides power to move the track system via the transmission system;

wherein the power assembly comprises a motor and a power wheel, and the power assembly is configured such that when powered, the motor starts operating, driving the power wheel to rotate;

wherein the transmission system is configured as a transmission rack, and the transmission rack meshes with the power wheel;

further comprising a front synchronous wheel, a rear synchronous wheel, and a synchronous belt, wherein both the front and rear synchronous wheels are fixed to the middle rail, and the synchronous belt is attached to the upper and lower rails through upper and lower fixed components, respectively;

wherein the position of the transmission rack and the synchronous belt are on the same side of the middle rail.

2. The electric slide rail according to claim 1, wherein the rotation of the power wheel simultaneously drives the transmission rack, causing the middle rail to move.

3. The electric slide rail according to claim 1, wherein:

as the middle rail moves, the front and rear synchronous wheels rotate under the action of the synchronous belt, causing the upper rail to displace as well.

4. The electric slide rail according to claim 1, wherein the displacement and linear velocity of the upper rail are twice the displacement and linear velocity of the middle rail.

* * * * *